United States Patent

[11] 3,629,580

[72] Inventor Colin S. Willett
Washington, D.C.
[21] Appl. No. 54,272
[22] Filed July 13, 1970
[45] Patented Dec. 21, 1971
[73] Assignee The United States of America as represented by the Secretary of the Army

[54] METHOD AND APPARATUS FOR OBTAINING HIGH-RESOLUTION X-RAY INTERFERENCE PATTERNS
10 Claims, 2 Drawing Figs.

[52] U.S. Cl. .................................................. 250/51.5, 250/65 R
[51] Int. Cl. ................................................. G01n 23/20
[50] Field of Search ................................... 250/51.5, 65

[56] References Cited
UNITED STATES PATENTS
2,843,750 7/1958 Hillier .......................... 250/51.5

*Primary Examiner*—Anthony L. Birch
*Attorneys*—Harry M. Saragovitz, Edward J. Kelly, Herbert Berl and J. D. Edgerton ABSTRACT: A high-resolution X-ray interferometer. The invention utilizes nonlocalized conical interference fringes which are formed when X-rays from a point source fall on a three-dimensional, planar crystalline array. Each atom within the crystal scatters radiation which then appears to originate from a set of virtual sources $S_1, S_2, S_3, ..., S_n$ located on a line perpendicular to the scattering planes of the crystal. At any point P' behind the point source (for a reflection arrangement) X-rays are received from $S_1, S_2, S_3, ..., S_n$ and interfere to form fringes, analogous to the familiar conical fringes in optics. If and only if the crystal or film of crystallites is thin and less than a certain thickness will interference fringes be formed at P'. Since the fringes are nonlocalized, no optics are required to produce any focusing. The structure of the fringes reveals the structure, not of the crystal, but of the X-ray spectra. By having large crystal-to-detector distances extremely large dispersions can be realized.

INVENTOR,
COLIN S. WILLETT
BY Harry M. Saragovitz
Edward J. Kelly
Herbert Berl
J. D. Edgerton
ATTORNEYS

ND APPARATUS FOR OBTAINING HIGH-
RESOLUTION X-RAY INTERFERENCE PATTERNS

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to X-ray interferometers and more particularly to a device and method for the precision measurement of X-ray absorption edges and emission lines in the X-ray spectral region.

2. Description of the Prior Art

Analysis of low energy X-ray spectra is presently achieved by using single or double crystal spectrometers in which Bragg diffraction determines whether or not X-rays scattered from the analyzing crystal of the spectrometer emerge as beams from the crystal. Due to the interference between the scattered radiation from the multitude of scattering atoms, scattered radiation emerges from a crystal as a beam only when the Bragg law $n\lambda=2d \sin \theta$ is satisfied and when the incident X-ray beam is nondivergent. Following X-ray convention, $\theta$ is the angle between the incident X-ray beam and the lattice planes of the crystal, $n$ is the order of reflection, $\lambda$ is the wavelength, and $d$ is the known distance between the parallel planes in the crystal. The angle $\theta$ is then the complement of the incident angle conventionally used in optics. Since the incident X-ray beam is parallel, the width of a spectral line is determined by the size of the collimating pinhole or slit. In optical spectrometers the resolution is also determined to a large extent by the diffraction limitation set by the slit. No such dependence applies when interferometric techniques are used. The best available low energy X-ray spectrometers have not achieved resolutions greater than $4.5 \times 10^4$. Because the refractive index of materials in the X-ray region is very closely unity, X-rays cannot be focused like visible radiation. Therefore, a simple system that would provide nonlocalized large dispersion, high-resolution X-ray spectra would be highly desirable.

Accordingly, the primary object of the present invention is to provide an X-ray interferometer in which extremely large dispersions and high resolutions can be realized.

Another object of the present invention is to provide a method for obtaining X-ray interference patterns which does not rely on beamsplitting or crystal diffraction techniques normally used for X-ray investigation.

A further object of the present invention is to provide an X-ray interferometer that utilizes nonlocalized conical fringes to analyze the structure of the X-ray spectra.

SUMMARY OF THE INVENTION

Briefly, in accordance with the invention, a method and apparatus for obtaining high-resolution X-ray interference patterns is provided. The apparatus comprises a point source of X-rays, a planar crystal or a membrane coated with fine crystallites which have a suitable crystalline lattice spacing, and a detector which can be an array of detectors, a single detector or a photographic plate. Depending on the crystalline spacing of the crystal or crystallites the thickness of the crystal must not exceed a certain length, referred to herein as the coherence length. The X-rays from the point source are directed onto the crystal whose atoms scatter the radiation, thereby creating a set of virtual sources. X-rays received from the virtual sources interference to produce fringes on the detector that are closely similar to the Fabry-Perot fringes produced in optics. The nonlocalized character of the fringes produced thereby obviate the need for optical focusing apparatus. In this invention the many scattering centers of the atoms replace the multiple reflections between two mirror surfaces used in Fabry-Perot etalons. By utilizing the method and apparatus presented herein, resolutions of greater than $10^5$ are realizable along with extremely large dispersions.

BRIEF DESCRIPTION OF THE DRAWINGS

The specific nature of the invention as well as other aspects, uses, and advantages thereof will clearly appear from the following description and from the accompanying drawings, in which.

DESCRIPTION OF THE PREFERRED EMBODIMENT

There exists in optics a device known as a Fabry-Perot etalon which is a multiple reflection interferometer of very high resolving power that is utilized to produce bright interference fringes for the detailed study of the hyperfine structure of visible spectrum lines. In the Fabry-Perot etalon, an extended source is commonly used which requires a collecting element, i.e., a lens, to bring the emergent parallel beams to a focus to form the interference fringes. A practical collecting element for X-rays does not exist so that one cannot use the Fabry-Perot etalon arrangement with an extended source for the analysis of X-ray spectra.

There is, however, in optics a type of interference fringe called conical fringes which are practically identical to Fabry-Perot fringes yet which do not require collecting elements to form them. See, for example, Multiple Beam Interferometry, S. Tolansky, Clarendon Press, Oxford, 1949, 2nd edition, pp. 8–13. These multiple beam nonlocalized fringes are formed by light from a point source making multiple reflections at an air-dielectric boundary and have been used extensively by Tolansky in studies of cleavage steps on samples of mica. The fringes have the property of enormous dispersion combined with the high resolution of Fabry-Perot fringes. I have discovered that nonlocalized X-ray fringes in reflection, directly analogous to the nonlocalized fringes used by Tolansky, can be observed with X-rays.

Figure 1:
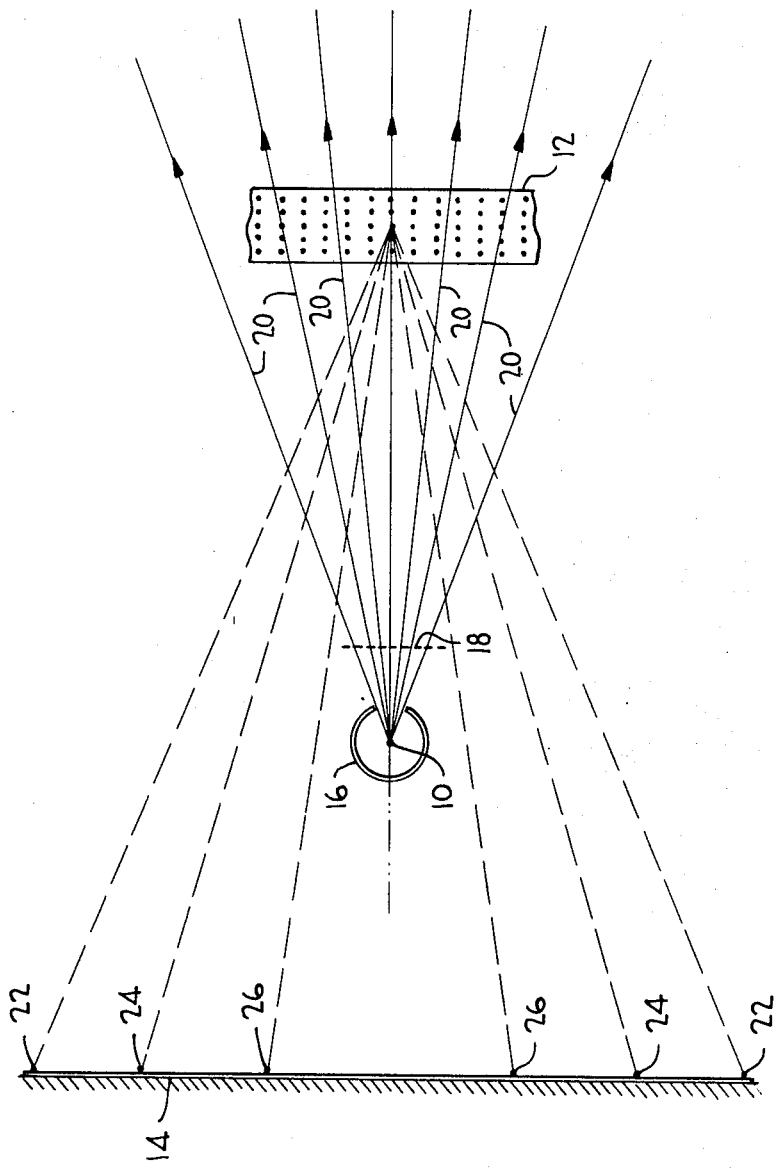
FIG. 1 illustrates the basic arrangement of the X-ray interferometer of the present invention.

Referring now to FIG. 1, the basic apparatus of the X-ray interferometer is seen to consist of a point source of X-rays 10, a suitable crystal 12, and a plane of detectors or a photographic plate 14. Point source 10 directs a spherical wave front of radiation as represented by rays 20 directly onto crystal 12. In this arrangement, a shield 16 is needed to prevent the radiation from source 10 from impinging directly upon detector 14. A suitable filter 18 may be placed in the path of the X-rays emanating from source 10 to isolate single spectrum lines for observation on plate 14. Alternatively, a coherent monochromatic beam may be utilized as source 10 to obviate the need for filter 18 when it is desired to study the hyperfine structure of single spectrum lines. Crystal 12 is a good quality laminar type crystal such as mica, or can be a membrane coated with a thin layer of crystallites, whose thickness must not be more than a predefined amount, referred to hereinafter as the coherence length. The conical fringes are formed on detector 14 and 22, 24 and 26 as a result of the multiple scattering of the X-rays by the atoms in crystal 12, explained more fully hereinafter.

Figure 2:
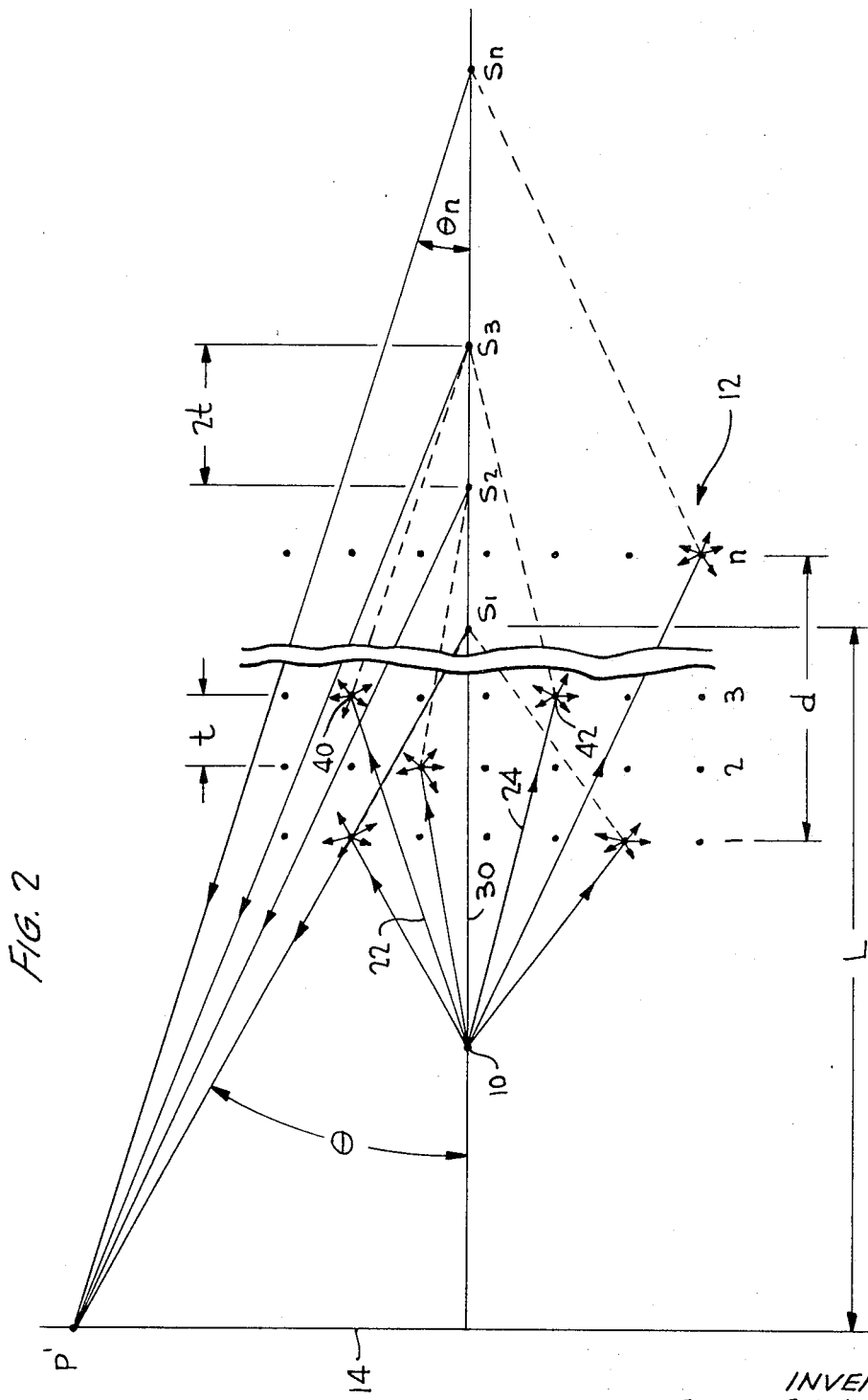
FIG. 2 shows an expanded and simplified view of FIG. 1 illustrating the formation of the nonlocalized conical fringes according to the present invention.

FIG. 2 shows an exaggerated view of the apparatus of FIG. 1 in which the effects of the multiple scattering of the X-rays from point source 10 are apparent. Crystal 12, shown greatly enlarged, has a series of $n$ vertical scattering planes numbered $1, 2, 3, \ldots, n$. These scattering planes are shown to be perpendicular to the center ray 30 of the X-ray radiation emanating from point source 10, but it is understood that these planes may be oriented in any suitable manner with similar results. The thickness of crystal 12 is indicated in FIG. 2 by $d$, and the distance between successive scattering planes within crystal 12 is indicated by $t$.

The multiple scattering of the X-rays from point source 10 that occurs at each atom, considered to be located at lattice points, produces in effect a series of virtual sources $S_1, S_2, S_3, \ldots, S_n$ at separations equal to $2t$, i.e., twice the spacing between the scattering planes in the crystal. This means that any point P' on detector 14 can be reached from any of the virtual sources $S_1, S_2, S_3, \ldots, S_n$ so that a nonlocalized interference fringe pattern will be formed in front of the crystal. Each vertical scattering plane in crystal 12 in effect creates its own virtual source located on a line perpendicular to the scattering planes. For example, if we consider X-ray 22 from point source 10 to impinge upon atom 40 and X-ray 24 from source 10 to impinge upon atom 42, the effect of the path differences in the scattered radiation from atoms 40 and 42 at point P' on detector 14 is the same as the interference which would be created by radiation emanating from virtual source $S_3$. This is true due to the fact that the path distance from source 10 to atoms 40 and 42, both located in plane 3 of crystal 12, is the same as the path distance from atoms 40 and 42 to virtual source $S_3$. In this way, it is seen that for each scattering plane in crystal 12, there will exist a virtual source located on the line perpendicular to the scattering planes. The resultant interference fringe located at any point P' on detector 14 is a result of the path differences in the scattered radiation from the different scattering planes within crystal 12 or, alternatively, a result of the path differences in the radiation emanating from virtual sources $S_1, S_2, S_3, \ldots, S_n$.

Paralleling the development given by Tolansky, ibid., chapter 15, pp. 171-177, the path difference $D_n$ between point P' and the virtual sources $S_1$ and $S_n$ is given by $$D_n = 2nt\cos\theta + 2n^2(t^2/L)\sin^2\theta\cos\theta \quad (1)$$

The refractive index of crystal 12 is taken to be unity, $n$ is the number of the virtual source, $t$ is the scattering plane spacing and $L$ is the distance between virtual source $S_1$ and detector 14. If $D_n$ equals $n\lambda$, where $n$ is an integer, constructive interference occurs and a "bright" fringe will be formed at point P'. The first term in the above equation is the difference in optical paths between two emerging parallel beams from two sources, corresponding to that applying in a Fabry-Perot etalon where to form a localized interference fringe pattern a lens must be used to bring emergent coherent parallel beams to a focus. The second term in the above equation is the optical path difference between $S_1$ P' and $S_n$ P', since the nonlocalized fringe pattern is produced by nonparallel "beams" which do not need to be collected to form interference fringes.

Since the rays emanating from the virtual sources $S_1, S_2, S_3, \ldots, S_n$, are not parallel, there will be a phase difference by which the $n$th ray lags behind the first ray over that of the first term in equation (1). The lag $\Delta$ is given by $$\Delta = 2(n^2-1)(t^2/L^2)\sin^2\theta\cos\theta \quad (2)$$

As long as $\Delta$ is less than $\lambda/2$, nondestructive interference will occur at P' at values of $\theta$ given by the Bragg Law (and the Fabry-Perot condition) to give a nonlocalized circular interference fringe pattern concentric with the normal between point source 10 and the crystal scattering planes. If we take as an example the detector 14 being located such that $\theta$ is approximately equal or less than 35°, the requirement for fringe formation is that $\Delta = (n^2-1)(t^2/2L) \leq (\lambda/2)$. Taking a practical case of $\lambda = 1$ A., a scattering plane spacing $t$ of mica of 20A. and a source-to-detector distance L of 10 cm., $\Delta$ is less than $\lambda/2$ for $n^2 \leq (L\lambda/t^2)$ or $n \leq 1.5 \times 10^3$. The thickness of $d$ of mica required to give this number of scattering planes, that is the number of virtual sources $S_1, S_2, S_3, \ldots, S_n$, is approximately $3.0 \times 10^{-4}$ cm. This is a practical crystal thickness. To reiterate, the path difference $\Delta$ between P'$S_1$ and P'$S_n$ must not approach $\lambda/2$ for the fringes to form, i.e., as the paths between P'$S_1$, P'$S_2$, P'$S_3$, etc., are not quite equal increments, a certain coherence length given by $d = \frac{1}{2}\sqrt{L\lambda}$ must not be exceeded.

For the above example, the angular separation of the fringes that are formed will be approximately 12°. Since the number of virtual sources which contribute to the intensity of a fringe at point P' is on the order of $1.5 \times 10^3$, the finesse F of the interferometer, where F is effectively the number of interfering beams, will also be on the order of $10^3$. This will result in a resolution close to $10^5$. Since L can be made much larger than that of 10 cm. chosen above for illustration, this figure for the resolution can be improved considerably. The resolution achievable using this method is better than that currently obtained with two crystal spectrometer techniques. Additionally, the technique will lend itself to utilization in space-science applications where simplicity, smallness and ruggedness combined with high resolution are a considerable advantage. Because the fringes are nonlocalized, no optics are required to produce any focusing. The structure of the fringes reveals the structure, not of the crystal, but of the X-ray spectra. In this invention, the many scattering centers of the atoms in the crystal replace the multiple reflections between two mirror surfaces used in Fabry-Perot etalons. Such fringes formed by the interferometer of the present invention have only been used heretofore in optics, and I believe that heretofore they have not been observed with radiation other than light.

I wish it to be understood that I do not desire to be limited to the exact details of construction shown and described, for obvious modifications will occur to a person skilled in the art.

I claim as my invention:

1. An X-ray interferometer, comprising:
   a. a point source of X-ray radiation;
   b. means for forming nonlocalized conical interference fringes for the analysis of said X-ray radiation comprising a laminar crystal not exceeding a prespecified thickness and having a plurality of parallel scattering planes onto which said X-ray radiation is directed and within which each atom scatters said X-ray radiation; and
   c. detection means noncoplanar with said point source for receiving and detecting said nonlocalized conical interference fringes formed due to the path differences of said scattered radiation from each of said scattering planes to said detection means.

2. The invention according to claim 1 wherein said interference fringes received by said detection means appear to originate from a plurality of virtual sources located on a line perpendicular to said scattering planes, the number of said virtual sources being equal to the number of scattering planes within said laminar crystal.

3. The invention according to claim 2 wherein said prespecified thickness is defined by one-half of the square root of the product of the detector-to-crystal distance and the scattering plane separation.

4. The invention according to claim 3 wherein the distance between successive virtual sources is equal to twice the distance between successive scattering planes.

5. The invention according to claim 4 wherein said detection means is located behind said point source of X-ray radiation and parallel to said scattering planes, said radiation from said point source being shielded from impinging directly upon said detection means.

6. The invention according to claim 4 further comprising an X-ray filter positioned between said point source and said laminar crystal for isolating desired spectrum lines of said X-ray radiation for observation upon said detection means.

7. The invention according to claim 4 wherein said detection means comprises a photographic plate.

8. The invention according to claim 4 wherein said detection means comprises an array of X-ray detectors.

9. A method of obtaining X-ray interference patterns, comprising the steps of:
   a. directing a coherent monochromatic beam of X-rays from a point source onto a highly perfect laminar crystal not exceeding a prespecified thickness and having a plurality of parallel scattering planes therein;
   b. scattering said X-rays in all directions by the atoms within said scattering planes; and
   c. positioning a detector parallel to said scattering planes of said crystal so as to receive the scattered radiation therefrom and whereon nonlocalized conical interference fringes are detected by virtue of the path differences of the scattered radiation between the detector and each of said scattering planes.

10. The invention according to claim 9 wherein said prespecified thickness is defined by one-half of the square root of the product of the detector-to-crystal distance and the scatter plane separation.